United States Patent
Ng et al.

(10) Patent No.: US 9,507,407 B2
(45) Date of Patent: Nov. 29, 2016

(54) METHOD AND APPARATUS FOR IMPROVING POWER CONSUMPTION ON A TOUCH DEVICE

(71) Applicant: QUALCOMM Incorporated, San Diego, CA (US)

(72) Inventors: Teresa Ka Ki Ng, San Diego, CA (US); William Yee-Ming Huang, Vista, CA (US); Qiang Gao, San Diego, CA (US); Hsun Wei David Wong, San Diego, CA (US); Carol King Mui Law, San Diego, CA (US); Rex Wang, San Diego, CA (US); Suhail Jalil, Poway, CA (US); Raghukul Tilak, San Diego, CA (US); Mohamed Imtiaz Ahmed, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/540,859

(22) Filed: Nov. 13, 2014

(65) Prior Publication Data
US 2015/0241950 A1    Aug. 27, 2015

Related U.S. Application Data

(60) Provisional application No. 61/943,203, filed on Feb. 21, 2014.

(51) Int. Cl.
  *G06F 1/32* (2006.01)
  *G06F 3/044* (2006.01)
  *G06F 3/045* (2006.01)
  *G06F 3/041* (2006.01)

(52) U.S. Cl.
  CPC .......... *G06F 1/3262* (2013.01); *G06F 1/3215* (2013.01); *G06F 3/044* (2013.01); *G06F 3/045* (2013.01); *G06F 3/0416* (2013.01)

(58) Field of Classification Search
  CPC .. G06F 1/3215; G06F 1/3262; G06F 3/0416; G06F 3/044; G06F 3/045
  USPC .................................................. 345/173, 174
  See application file for complete search history.

(56) References Cited

U.S. PATENT DOCUMENTS

| | | | |
|---|---|---|---|
| 2004/0046749 A1* | 3/2004 | Ikeda | G06F 3/0488 345/173 |
| 2004/0083247 A1 | 4/2004 | Koont | |
| 2006/0088195 A1 | 4/2006 | Tykowski et al. | |
| 2006/0202982 A1 | 9/2006 | Shinoda et al. | |
| 2007/0018966 A1 | 1/2007 | Blythe et al. | |
| 2008/0106520 A1* | 5/2008 | Free | G06F 3/03545 345/173 |
| 2011/0032201 A1 | 2/2011 | Naka | |
| 2011/0298757 A1 | 12/2011 | Hata et al. | |

(Continued)

OTHER PUBLICATIONS

International Search Report and Written Opinion—PCT/US2015/016390—ISA/EPO—May 29, 2015.

*Primary Examiner* — Dmitriy Bolotin
(74) *Attorney, Agent, or Firm* — Knobbe, Martens, Olson & Bear LLP

(57) ABSTRACT

Lower report rates are desirable in touch devices to minimize power consumption. However, lower report rates lead to inaccurate and untimely depiction of a user's touch inputs on a touch display device. Disclosed are methods and apparatus for using a lower report rate; while maintaining substantially the same or better user experience achieved by using a higher report rate.

27 Claims, 6 Drawing Sheets

(56) References Cited

U.S. PATENT DOCUMENTS

| | | |
|---|---|---|
| 2012/0299864 A1 | 11/2012 | Tong et al. |
| 2013/0265243 A1 | 10/2013 | Law |
| 2013/0278515 A1 | 10/2013 | Kikuchi |
| 2014/0354583 A1* | 12/2014 | Tokutake .............. G06F 3/0416 345/174 |

\* cited by examiner

METHOD AND APPARATUS FOR IMPROVING POWER CONSUMPTION ON A TOUCH DEVICE

CROSS REFERENCE TO RELATED APPLICATIONS

This application claims the benefit of U.S. Provisional Application No. 61/943,203, filed Feb. 21, 2014, entitled "METHOD AND APPARATUS FOR IMPROVING POWER CONSUMPTION ON A TOUCH DEVICE, the entire contents of which are hereby incorporated by reference herein.

TECHNICAL FIELD

The present application relates generally to touch devices, and more specifically to systems, methods, and devices for improving power consumption on a touch device.

BACKGROUND

High quality touch controller panels in touch devices often use high report rates to facilitate a pleasant and seamless user experience. A user's inputs to a touch device may be detected frequently and accurately. When these inputs are displayed back to a user, such as in a drawing program, these frequent inputs may allow a user to draw or write on the touch device. However, a touch panel report rate is proportional to power consumption. In some cases, a high report rate may be unnecessary and may be reduced to conserve power. This reduced report rate may be noticeable to users and may create an experience where the user's touch inputs are not accurately and timely depicted by the touch device due to the touch inputs missed as the result of reduced report rate. Such an experience may be undesirable, and may not work to facilitate a pleasant and seamless user experience

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

In some aspects, an apparatus for generating touch inputs is disclosed. The apparatus includes a touch device, and a processor configured to receive sensed touch input values from the touch device and generate a model of the sensed touch input values. The processor may be further configured to upsample the sensed touch input values using the model of the sensed touch inputs to generate at least one additional touch input value, and display information representative of the sensed touch input value and the at least one additional touch input value.

In some aspects, the processor may be further configured to generate a model of the sensed touch input values by fitting a curve to a number of the sensed touch input values or to generate a model of the sensed touch input values using linear regression. The processor may be further configured to generate a model of the sensed touch input values by minimizing a mean square error between the sensed touch input values and the generated at least one additional touch input value. The processor may be further configured to generate a model of the sensed touch input values using a quadratic equation. The processor may be further configured to use a number of sensed touch input values to model the sensed touch input values. For example, the number of sensed touch input values used to model the sensed touch input values may be the most recent ten or fewer sensed touch inputs received from the touch device. In some aspects, the touch device may include a capacitive touch panel.

One aspect of the present disclosure includes a method of generating touch inputs, including receiving sensed touch input values from a touch device, generating a model of the sensed touch input values, upsampling the sensed touch input values using the model of the sensed touch inputs to generate at least one additional touch input value, and displaying information representative of the sensed touch input value and the at least one additional touch input value.

In one aspect, the present disclosure provides an apparatus for generating touch inputs. The apparatus includes means for receiving sensed touch input values from a touch device, means for generating a model of the sensed touch input values, means for upsampling the sensed touch input values using the model of the sensed touch inputs to generate at least one additional touch input value, and means for displaying information representative of the sensed touch input value and the at least one additional touch input value.

One aspect of the present disclosure provides a non-transitory computer storage that stores executable program instructions that direct a wireless communications device to perform a process. The process includes receiving sensed touch input values from a touch device, generating a model of the sensed touch input values, upsampling the sensed touch input values using the model of the sensed touch inputs to generate at least one additional touch input value, and displaying information representative of the sensed touch input value and the at least one additional touch input value.

DETAILED DESCRIPTION

Figure 1:
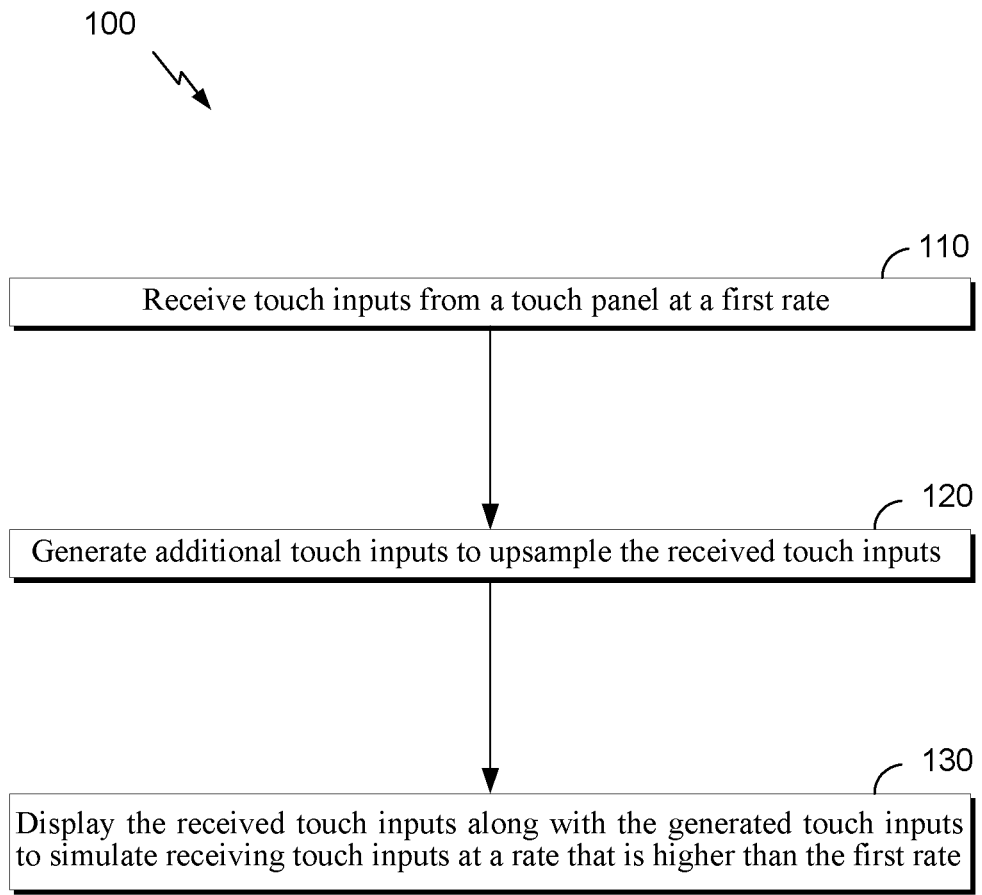
FIG. 1 is an illustration of a method of increasing an apparent touch reporting rate using upsampling.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

A touch panel device may use a specific report rate to detect a user's touch inputs on a touch panel. For example, a touch display may include a sensing circuit to detect the capacitance (or other characteristic) at a plurality of locations, (for example, sensing nodes) that are distributed across a touch panel, a certain number of times per second. For example, a touch panel device may operate to detect touches on the touch panel at a rate of 20, 30, 50, or 60 hertz. Thus, at a given number of times per second, each of the plurality of locations may be sampled (or queried or may report) its capacitance to a touch controller or a touch processor. This sampling may be referred to as a "reporting rate" of a touch panel.

In some embodiments, touch displays sensing may also be based on characteristics others than capacitance, for example, a touch panel sensing may be based on resistance changes. As with capacitive touch devices, these other touch devices may also report a given characteristic (such as resistance at a plurality of points on a touch screen) a certain number of times per second, or be polled a certain number of times per second. Accordingly, touch displays using other technologies may also have a reporting rate.

In a touch device, the reported characteristic(s) (e.g., capacitance or resistance) may be used to determine a location, if any, of one or more touch input on the touch screen. For example, capacitance measurements from a touch device may be used to determine whether a user touched a touch screen at that time, and if so, where that user touched. Touch screens may also be capable of detecting multiple simultaneous touch events, in order to allow for multi-touch based gestures, such as pinching, as well as for other reasons. As with reporting these characteristics, this processing to determine one or more locations may be done at the reporting rate. In some aspects, this may also be done at a reporting rate which differs from the reporting rate of the touch panel generating the characteristics of a touch.

Generally, higher report rates may be desirable to detect more of the user's touch inputs, and to detect the movement of those inputs with more granularity (or detail). For example, if a user is using a drawing or a writing program on a touch panel, higher report rates may allow to touch panel to capture more of the user touch inputs can may result in more precision for displaying the drawing as the user intend. However, having higher reporting rates may increase power consumption, when compared to lower reporting rates. That is, a higher reporting rate can correspond with a higher rate of power consumption, and a lower reporting rate can correspond with a lower rate of power consumption. Accordingly, a higher reporting rate to have increased precision may be especially problematic in mobile or wireless touch screen devices, such as those which operate using battery power. Such devices may have reduced battery life when a higher touch screen reporting rate is used, compared to using a lower reporting rate. Additionally, not all uses of a touch display device require high report rates. For example, applications in which a user is only intermittently clicking on certain items, (for example, web browsing) may not need as high a reporting rate as a drawing application or as certain types of games.

Thus, a relatively lower reporting rate may be used in order to reduce power consumption and improve battery life compared to a higher reporting rate. For example, a reporting rate may be cut by one-half (or another amount), which may result in a corresponding decrease in power consumption of the touch display. To maintain a high-quality user experience, touch inputs which are received at a relatively lower reporting rate may be upsampled in order to retain precision and substantially the same user experience achieved by higher report rates, and to reduce power consumption.

FIG. 1 is an illustration of a method 100 of increasing a touch reporting rate using upsampling. This method 100 may be used by a device with a touch panel in order to achieve a better user experience at a lower touch display sampling rate.

Figure 5:
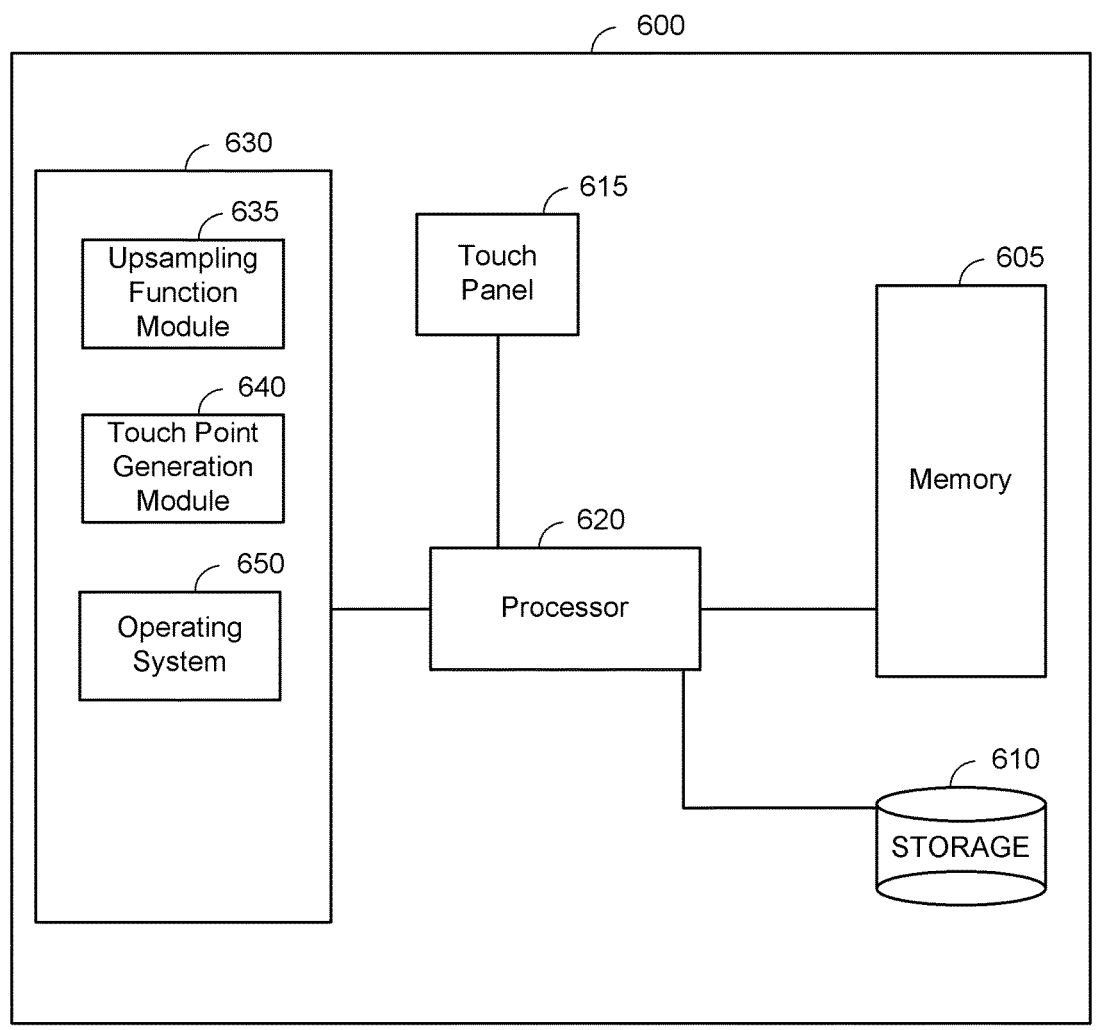
FIG. 5 depicts a high-level block diagram of a device having a set of components, including a processor operatively coupled to a touch panel, that may operate to perform embodiments of the invention.

At block 110, the method 100 includes receiving touch inputs from a touch panel at a first rate. For example, these touch inputs may be received at a rate that is lower than a desired touch panel reporting rate. For example, this first rate may be less than an optimal rate, in order to use less power. The means for receiving touch inputs may include a processor. This processor may, for example, be a touch processor or a touch controller, or another processor. In some aspects, the touch inputs may be received directly from a touch panel, or may be received from a touch processor or a touch controller. A touch panel device having a processor configured to perform upsampling of touch inputs is illustrated in FIG. 5.

At block 120, the method 100 includes generating additional touch inputs to upsample the received touch inputs. For example, additional touch inputs may be generated based upon previous touch inputs. In one aspect, a number of previously received touch inputs "X" may be evaluated in order to determine where a future touch input may be received from, and that input may be generated accordingly. For example, if touch inputs are being received at the rate of once per second, the previous five seconds of touch input may be analyzed, and a path of the touch inputs may be created. Based on this path, touch inputs may be generated for times between the times of the sensed touch inputs. Also, based on this path, touch inputs may be generated for times between the current touch inputs and an expected next touch input. For example, for each one touch input received, one, two, or more touch inputs may be generated.

At block 130, the method 100 includes displaying the received touch inputs along with the generated touch inputs to simulate receiving touch inputs at a rate that is higher than the first rate. For example, the generated touch inputs may be included as touch inputs in-between the various received touch inputs form the touch panel. A different number of touch inputs may be generated for each received touch input. For example, one, two, or more touch inputs may be generated between each pair of received touch inputs. In some aspects, these generated touch inputs may be based on touch inputs received prior to the generated input, since they may be generated prior to the next touch input being received. For example, if a touch input is received at time 0 and at time t, another touch input may be generated at time 0.5t, which may simulate an expected touch input at that time, based upon the received touch inputs up to an including the touch input at time 0. In some aspects, displaying the touch input may include any manner of using the touch input in a touch screen device. For example, in a drawing program, the generated touch inputs may be used in the same manner as received touch inputs would be used. For example, the received and generated touch inputs may be used to draw and paint in the drawing program, as appropriate. In some aspects, the generated touch inputs and the received touch inputs may be displayed by transmitting both sets of inputs to an operating system or an application on a touch device. For example, all of these inputs may be transmitted to the operating system, and each input may be used in the same manner for an application that is operating to receive inputs form the touch panel.

Figure 2:
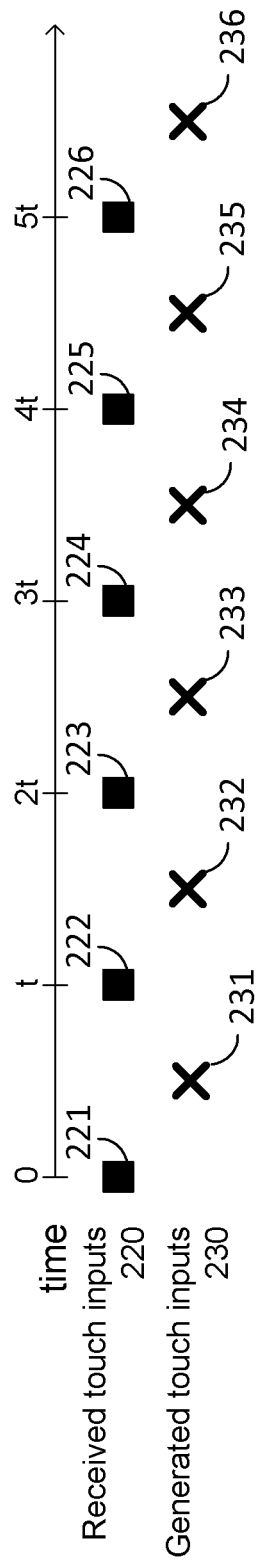
FIG. 2 is an illustration of the timing of received and generated touch inputs according to some aspects of the present disclosure.

FIG. 2 is an illustration of the timing of received and generated touch inputs according to some aspects of the present disclosure. As illustrated, touch inputs may be received at time 0, time t, 2t, 3t, and so on. In addition to these received touch inputs 220, a number of generated touch inputs 230 may be generated (by for example, a processor of the touch device). For example, one generated touch input 230 may be generated between every pair of received touch inputs 220, such as at times 0.5t, 1.5t, 2.5t, and so on.

Each generated touch input 230 may be generated based upon a number of received touch inputs 220 which were received prior to the time of the generated touch input. For example, generated touch input 234 may be generated at time 3.5t. Generated touch input 234 may be generated based upon one or more received touch inputs 220 which were received prior to time 3.5t. For example, in some aspects, a touch input may be generated based on four touch inputs received prior to the generated touch input. In this situation, generated touch input 234 may be generated based on received touch inputs 221, 222, 223, 224. For example, a processor may be configured to generate a touch input based on trends in previous received touch inputs 221, 222, 223, 224, such as trends in direction of a series of touches, acceleration of the center of a touch, speed of movement of the center of a touch, changes in pressure of a touch, and/or other aspects of the received touch inputs 221, 222, 223, 224. In some aspects, generating these additional touch inputs may be referred to as upsampling.

It may be desirable to test various methods of upsampling, and various amounts of upsampling (such as one generated touch input per received input, or more generated touch inputs per received input) that may be done without losing too much information about user inputs. For example, different techniques may be used to generate upsampled touch inputs. Further, different amounts of upsampled touch inputs may be generated. For example, for each touch input that is received, the system may generate one, two, three, four or more upsampled touch inputs. In some aspects, the number of touch inputs generated may vary based on, for example, the speed at which a touch input is moving. For example, if a user is moving their finger quickly on the screen, it may be useful to generate more touch inputs than if a user is holding their finger stationary. Accordingly, it may be desired to have an experimental setup to determine preferred upsampling settings to decrease power consumption and maintain a high-quality user experience. For example, an upsampling setup may use a number of received touch inputs. These touch inputs may first be downsampled by any given amount. These downsampled inputs may then be upsampled, using a particular algorithm, by the same amount. Thus, the upsampled inputs may be compared to the original inputs, in order to determine how accurate the upsampled inputs are.

For example, in one experimental setup, data of touch locations may be acquired from a touch screen at a reporting rate of F Hz. This original touch data may be downsampled by a factor of M, where M is greater than one, and may be used to imitate data acquired at a rate of F/M Hz. This downsampled data may then be upsampled by a factor of N, where N is greater than one. Accordingly, this upsampling technique may report data to an OS layer at a rate of F*N/M Hz.

In a special case, where M and N are equal, the processed data reported to the OS later at F*N/M Hz may be compared to the original data captured at F Hz. Quality of the post-processing—that is, accuracy of the upsampling in recreating the original inputs—may be quantified by calculating a minimum mean square error between the two sets of data. Accordingly, this minimum mean square error value may be used to compare the accuracy of various upsampling techniques against each other, in order to refine those upsampling techniques.

Figure 3:
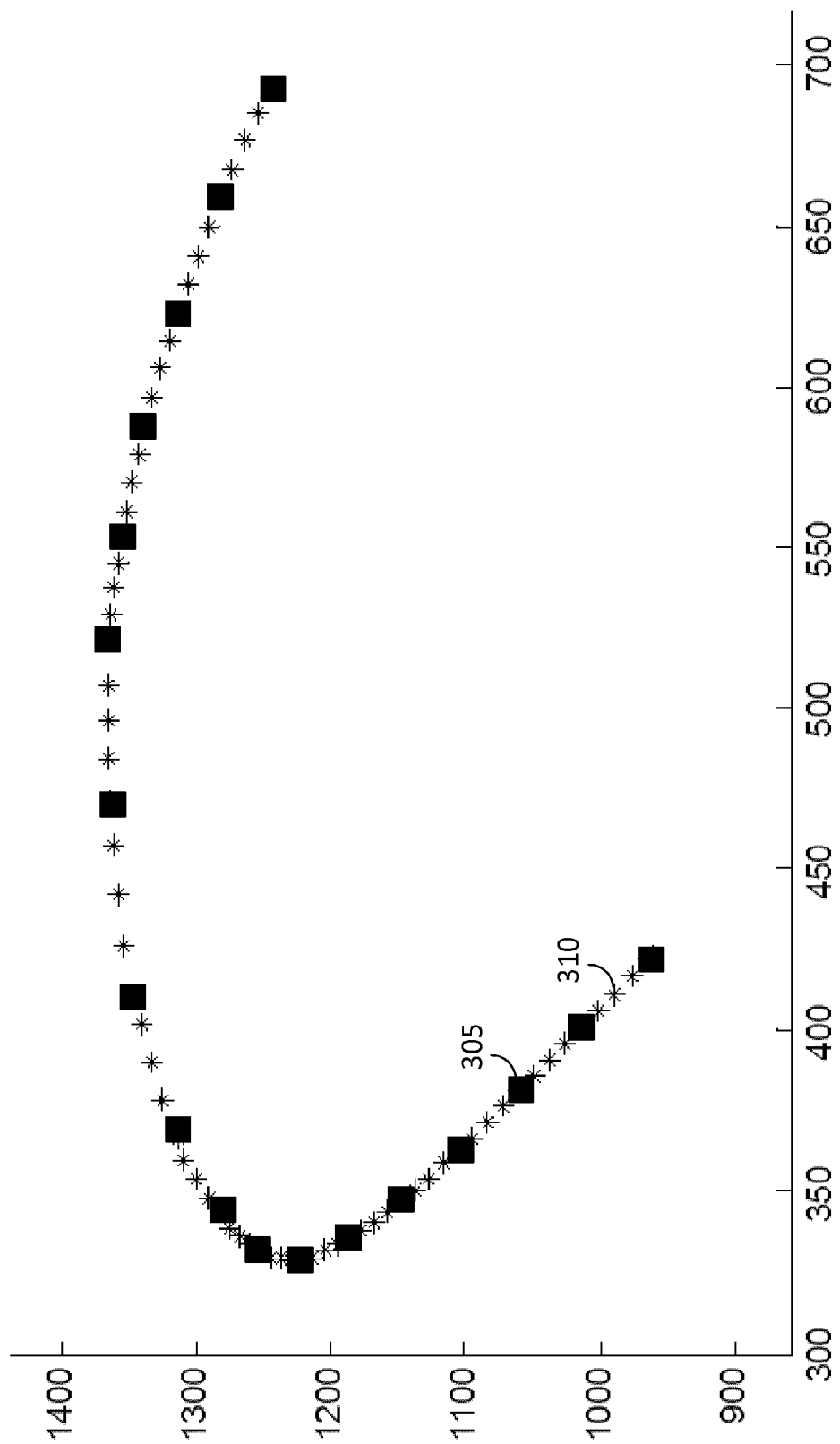
FIG. 3 is an illustration of the locations of received and generated touch inputs according to some aspects of the present disclosure.

FIG. 3 is an illustration of the locations of received and generated touch inputs according to some aspects of the present disclosure. In this illustration, there may be three generated touch inputs, represented by stars, such as generated touch input 310 for each received touch input, represented by squares, such as received touch input 305.

The received touch inputs may be received according to a fixed schedule, such as being received a certain number of times per second. Touch inputs may be generated between (in time) each pair of received touch inputs. For example, if touch inputs are received at time 0, t, 2t, and so on, touch inputs may be generated at times 0.25t, 0.5t, 0.75t, 1.25t, 1.5t, 1.75t, and so on. As illustrated, three touch inputs may be generated for each received touch input. In some aspects, other numbers of touch inputs may be generated as well. For example, one, two, four or another number of touch inputs may be generated between each pair of received touch inputs, in order to upsample the received touch inputs to a higher rate.

Figure 4:
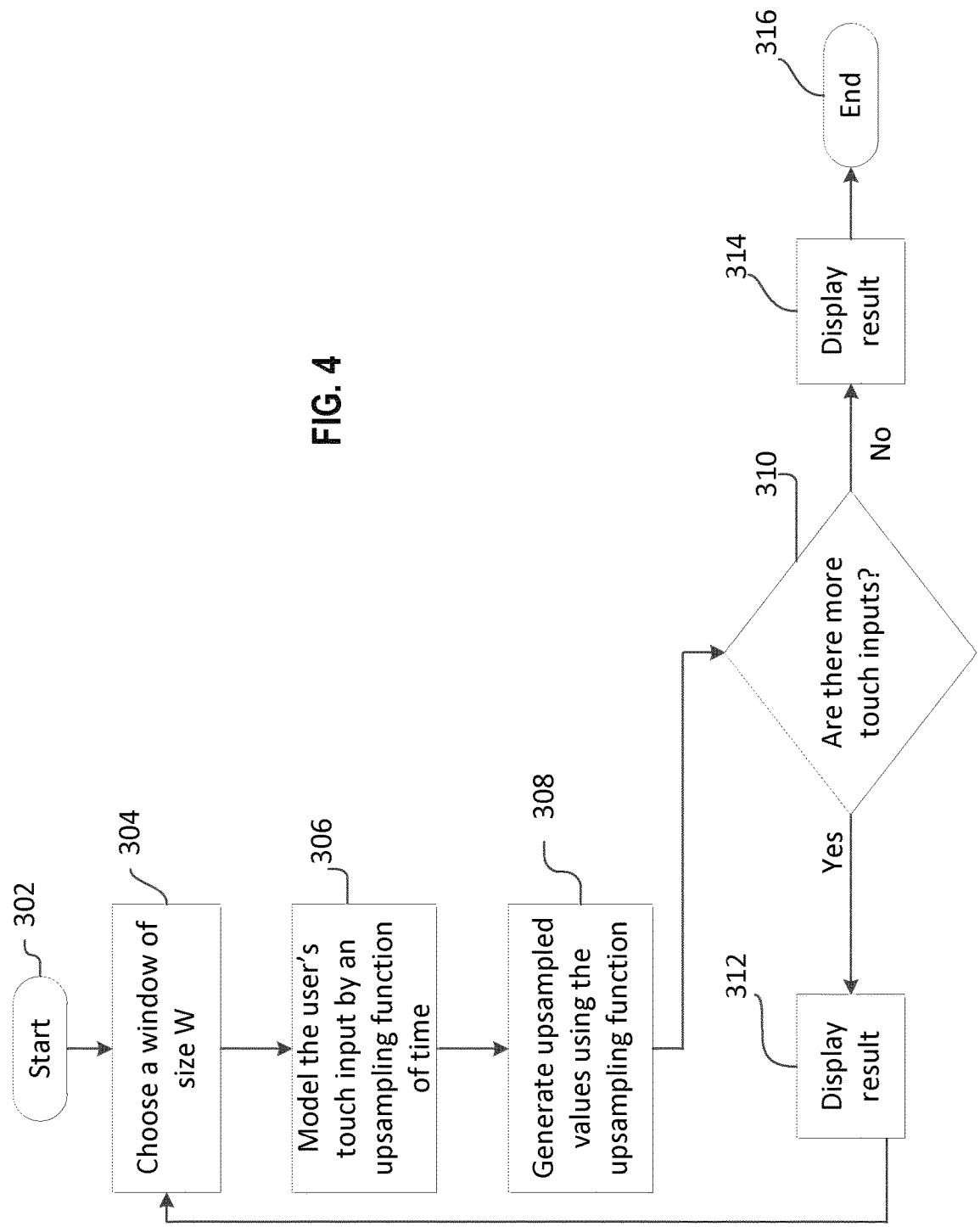
FIG. 4 is a flow chart of an algorithm for upsampling a user's touch inputs according to an embodiment.

FIG. 4 is a flow chart of an algorithm for upsampling a user's touch inputs according to an embodiment. This embodiment may be used, for example, to test the efficacy of an upsampling algorithm, or to upsample received touch inputs. The process starts in block 302. In block 304, a window of size W may be selected referring to how many previous received touch points (in addition to the current touch point) are used to generate the upsampling function of time. For example, generating additional touch points through upsampling may use the current (or most recent) touch point, as well as a number of previous received touch points as sampled by a touch panel or other touch device. The window size W may specify how many received touch points may be used, in addition to the current touch point in generating the upsampled touch points. As a non-limiting example, a window of size 4 can be chosen to generate the upsampling function to generate additional touch points. When a window size of 4 is used, the current received touch point and the 4 received touch points prior to the current touch point may be used to generate one or more generated touch points. Other values may also be used for this upsampling function.

In block 306 according to an embodiment, an upsampling function using two quadratic equations 1 and 2, below, for horizontal and vertical values x and y, respectively, may be used to model the current and previous touch inputs W:

$$x(t)=at^2+bt+c \qquad \text{Eq. 1}$$

$$y(t)=dt^2+et+f \qquad \text{Eq. 2}$$

For example, these two equations may be matched to the received touch points in order to establish a best fit for the parameters a, b, c, d, e, and f. Based on these parameter values, additional touch points may be generated for other values of t (time) where there was not a received touch point. Other functions may also be used to generate values of x(t) and y(t). These equations may be appropriate for two-dimensional drawing, in some instances. These equations may be repeated at each time instant, using the current (x,y) location and the previous W (x,y) locations. The parameters of the upsampling function, a, b, c, d, e, and f, in this case, can be ascertained by using any approximation technique, for example, linear regression. Other approximation techniques can also be used.

The upsampling function parameters can be further refined by, for example, minimizing the mean square error of Equations 1 and 2 based on the previous W touch inputs. Other sample or data refinement algorithms can also be used.

In block 308, once the upsampling function parameters are determined, the upsampling function can be used to generate additional touch inputs in order to upsample the received touch inputs. For example, this upsampling may be done, in a test environment, by upsampling previously down-sampled inputs, in order to ascertain how closely the upsampled inputs match the originally-received inputs.

In decision block 310, if there are no more touch inputs both the actual sampled touch inputs and the upsampled touch input values generated by the upsampling function are displayed by the touch device in block 314 and the process ends in block 316. If there are still touch inputs such as new touch inputs being received or additional touch inputs as part of the previously-downsampled touch inputs, the result so far, including the actual sampled touch inputs and the upsampled touch input values generated by the upsampling function are displayed by the touch device in block 312, and the process repeats again from block 304 or 306.

In some aspects, the value of the window of size W can be determined dynamically depending on the values of the displacement between a user's touch inputs. For example, the value of the window of size W may be chosen to be inversely proportional to that displacement. That is, the larger the displacement between touch inputs (that is, the faster a finger or other touch input device is moving), the smaller window size W may be used. Reducing the size of the window W when displacement between touch inputs is high can keep the spatial distance of the window relatively constant. In the case of a fast drawing by a user, or low report rate of a touch device, the samples are far apart and a smaller window of size W can be used. Conversely, in the case of a slow drawing by a user or higher report rate of a touch device a larger window of size W can be used.

Equations 1 and 2 may thus be used to generate upsampled touch inputs. These upsampled touch inputs may then be used in conjunction with the received touch inputs, and both the upsampled and the received touch inputs may be passed along by the touch display controller or other hardware to other levels of the system, such as to an operating system of a device. Accordingly, such upsampling may allow for the appearance of a higher touch display sampling rate than is actually used, which may allow for less power consumption.

FIG. 5 depicts a high-level block diagram of a device 600 having a set of components including a processor 620 operatively coupled to a touch panel 615. A working memory 605, storage 610, and memory 630 are also in communication with and operative attached to the processor. Device 600 may be a device configured to receive touch inputs from the touch panel, but to upsample those inputs in order to simulate a higher rate of touch inputs.

The touch panel 615 may be configured to capture a number of touch inputs. For example, the touch panel 615 may receive a touch inputs at a particular rate. These touch inputs may be received using a capacitive touch panel, a resistive touch panel, or another method. In some aspects, each touch input may be thought of as one or more pixel locations, at which a touch was received. For example, these pixel locations may point to a center of a touch point from a user. Touch inputs may be received by the processor 620 from the touch panel 615 at a set rate, such as a certain number of times per second. The touch panel 615 may include a number of different sensors which may be arranged in a number of rows and columns, in order to form a grid. The touch panel 615 may be coupled to the processor (or "touch processor") 620 to transmit a received touch inputs to the processor 620. The processor 620 may be configured to perform various operations on a received touch inputs.

Processor 620 may be a general purpose processing unit or a processor specially designed for the disclosed methods. As shown, the processor 620 is connected to a memory 630 and a working memory 605. In the illustrated embodiment, the memory 630 stores upsampling function module 635, touch point generation module 640 and operating system 650. These modules include instructions that configure the processor to perform various tasks. Working memory 605 may be used by processor 620 to store a working set of processor instructions contained in the modules of memory 630. Alternatively, working memory 605 may also be used by processor 620 to store dynamic data created during the operation of device 600.

As mentioned above, the processor 620 is configured by several modules stored in the memories. For example, the upsampling function module 635 may include instructions that configure the processor 620 to create an upsampling function. For example, this module may receive a number of touch inputs from the touch panel 615 or from the processor 620. These touch inputs may be stored in the memory 605 or the storage 610. The received touch inputs may be touch inputs that have been received from the touch panel 615, over an interval of time. Based upon these received touch inputs, the upsampling function module 635 may generate an upsampling function. For example, this upsampling function may include generating coefficients a, b, c, d, e, and f from Equations 1 and 2 above which most closely match the received touch inputs. For example, this may be done using linear regression or by minimizing a mean square error of the difference between Equations 1 and 2 and the received touch inputs. Accordingly, the upsampling function module 635 may be configured to generate an upsampling function, according to some aspects of the present disclosure.

The memory 630 may also contain a touch point generation module 640. The touch point generation module 640 may contain instructions that configure the processor 620 to generate one or more touch points based on received touch inputs. For example, the touch point generation module 640 may receive an upsampling function from the upsampling function module 635, and may use this function to generate one or more generated touch inputs. The touch point generation module 640 may further contain instructions to combine the received touch inputs and the generated touch inputs, in order to use both sets of touch inputs on the device. For example, this combination may be made at a level higher than an operating system 650 on the device. Accordingly, the operating system 650 may receive touch inputs that include both the touch inputs received from the touch panel 615 and the touch inputs generated by the touch input generation module 640. In some aspects, the touch point generation module 640 may operate at a lower level than the operating system 650, but may operate at a higher level than certain applications which may operate on the device 600.

Operating system module 650 configures the processor to manage the memory and processing resources of device 600. For example, operating system module 650 may include device drivers to manage hardware resources such as the touch panel 615 or storage 610. Therefore, in some embodiments, instructions contained in modules discussed above may not interact with these hardware resources directly, but instead interact through standard subroutines or APIs located in operating system component 650. Instructions within operating system 650 may then interact directly with these hardware components.

Processor 620 may write data to storage module 610. While storage module 610 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 5 depicts a device having separate components to include a processor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 5 shows two memory components, to include memory component 630 having several modules, and a separate memory 605 having a working memory, one with skill in the art would recognize several embodiments utilizing different memory architectures. For example, a design may utilize ROM or static RAM memory for the storage of processor instructions implementing the modules contained in memory 630. Alternatively, processor instructions may be read at system startup from a disk storage device that is integrated into device 600 or connected via an external device port. The processor instructions may then be loaded into RAM to facilitate execution by the processor. For example, working memory 605 may be a RAM memory, with instructions loaded into working memory 605 before execution by the processor 620.

Figure 6:
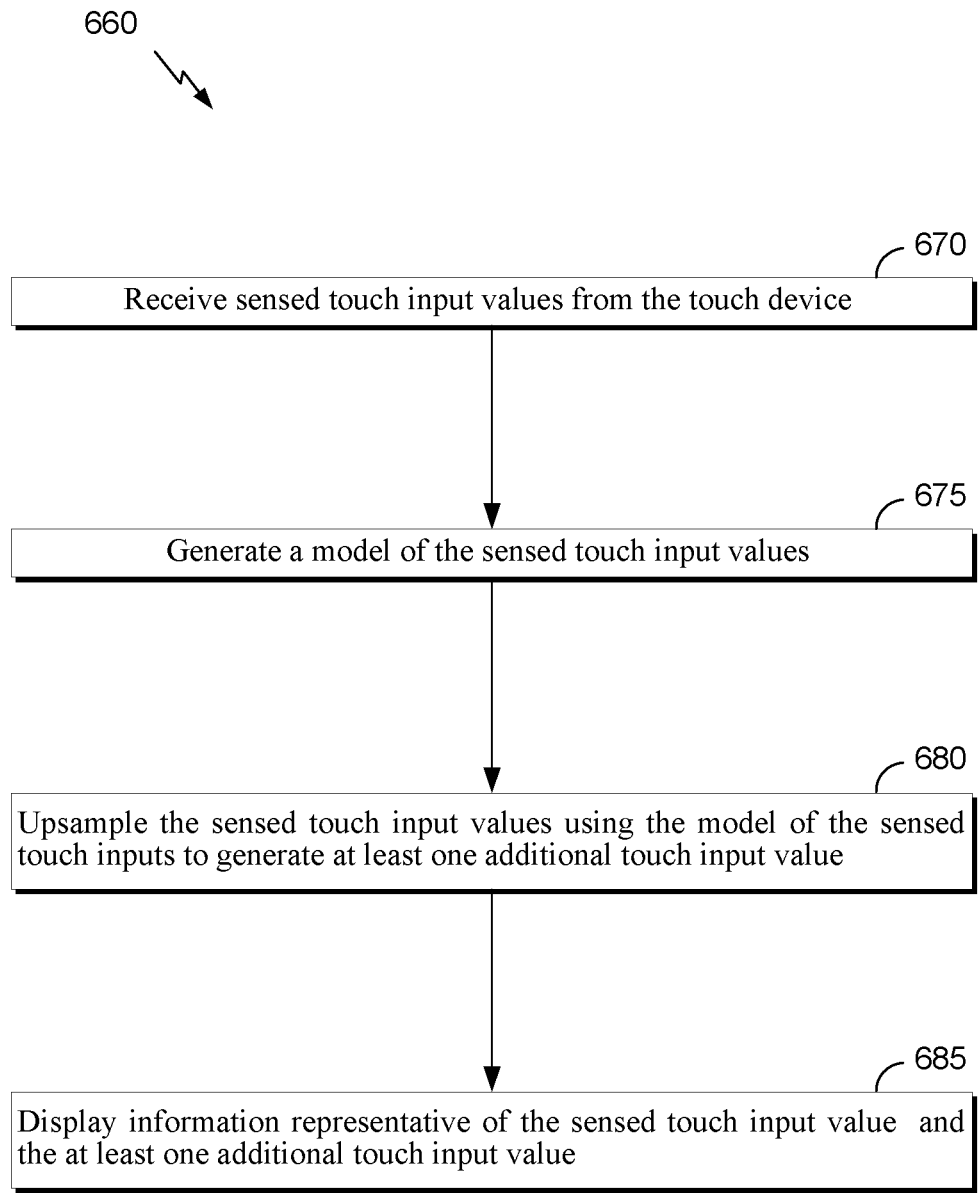
FIG. 6 is a flowchart of a method of upscaling received touch inputs according to some aspects of the present disclosure.

FIG. 6 is a flowchart of a method 660 of upsampling received touch inputs according to some aspects of the present disclosure. This method may be done by a device such as device 600. This method may be used to generate additional touch panel inputs, based on received touch panel inputs, in order to simulate receiving touch panel inputs at a higher rate.

At block 670, the method includes receiving sensed touch input values from a touch device. For example, the device 600 may include a touch panel, either an integrated touch panel or an outside touch panel. Touch inputs may be received from the touch panel according to a schedule, such as a certain number of times per second. The method may, therefore, choose a certain number of those touch inputs which have been received from the touch panel. In some aspects, for example, the method may choose a certain number of the most recent touch inputs, such as selecting the last ten or fewer touch inputs. For example, as discussed above, different numbers of touch inputs may be used for generating more touch inputs. In some aspects, the means for choosing a number of touch inputs may include a processor. In some aspects, the means for receiving touch inputs may include a processor.

At block 675, the method includes generating a model of the sensed touch input values. For example, a model may include one or more quadratic equations such as those in equations 1 and 2. Other types of functions may also be used for the model as well. This model may include a number of coefficients or other parameters. Accordingly, modeling the previously sampled inputs may include choosing a function, and determining the coefficients for the function. In some aspects, generating a model may include fitting a curve to the number of sensed inputs. The coefficients of the function in the model may be determined, at least in part, by using linear regression. In some aspects, the coefficients may be determined, at least in part, by minimizing a mean square error between the number of previously sampled touch inputs and the additional upsampled values. In some aspects, the means for generating the model may include a processor. In some aspects, the means for minimizing error may include a processor. In some aspects, the means for fitting a curve may include a processor. In some aspects, the means for using linear regression may include a processor. Generating a model may include using a number of sensed inputs to model the sensed touch input values. For example, the number of inputs used may be ten or less. In some aspects, the means for using a number of sensed touch input values may include a processor.

At block 680, the method includes upsampling the sensed touch input values using the model of the sensed touch inputs to generate at least one additional touch input value. For example, the model may be an equation (such as a quadratic equation or another equation) that is a function of time. Using this model, one or more touch inputs may be generated for times at which a touch input has not been, and will not be, received. For example, if a touch input is received every X seconds (where X could be, for example, $\frac{1}{60}$th of a second), additional touch inputs could be generated for $\frac{1}{2}X$, $1\frac{1}{2}X$, and so on. In some aspects, generating touch inputs may include using the equation that was modeled in the previous step, and using that equation with a different value of X, in order to simulate what a touch input received at a different time might be. In some aspects, the means for upsampling may include a processor.

At block 685, the method includes displaying the additional upsampled values along with the previously sampled touch inputs. For example, this may include displaying the additional touch inputs, such as on a display. In some aspect, this may include passing along the additional touch inputs to an application on a device, such that the application may receive both the touch inputs from the touch panel, and also touch inputs that were generated using the techniques disclosed here. Accordingly, an application, such as a drawing application, may use all of these touch inputs and display all of the inputs on the screen of a device. Accordingly, this method may improve performance of a mobile device, by simulating the effect of a higher touch panel input rate without requiring the additional power usage that sampling a touch panel at a higher display rate may require. In some aspects, the means for displaying the inputs may include a display or a processor.

It should be understood that any reference to an element herein using a designation such as "first," "second," and so forth does not generally limit the quantity or order of those elements. Rather, these designations may be used herein as a convenient wireless device of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with the figures may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for generating touch inputs, comprising:
a touch device; and
a processor configured to:
  receive, from the touch device, data representing a sensed time and sensed location on the touch device of each of a plurality of sensed touch inputs;
  generate a model of the sensed touch inputs by calculating a best fit for parameters of an upsampling function based on the sensed location and sensed time of at least some of the plurality of the sensed touch inputs;
  upsample the sensed touch inputs using the model to generate at least one additional touch input at a point of the upsampling function corresponding to a time at which there is no sensed touch input and which is after a sensed time of a most recent sensed touch input of the plurality of sensed touch inputs, the point corresponding to an additional location on the touch device; and
  display a visual representation of
    the sensed touch inputs at the sensed locations on the touch device, and
    the at least one additional touch input at the additional location on the touch device.

2. The apparatus of claim 1, wherein the processor is further configured to generate the model of the sensed touch inputs by fitting a curve to the at least some of the plurality of sensed touch inputs.

3. The apparatus of claim 1, wherein the processor is further configured to generate a model of the sensed touch inputs using linear regression to calculate the best fit for the parameters of the upsampling function.

4. The apparatus of claim 1, wherein the processor is further configured to generate the model of the sensed touch inputs by minimizing a mean square error between the sensed touch inputs and the generated at least one additional touch input.

5. The apparatus of claim 1, wherein the processor is further configured to generate the model of the sensed touch inputs using a quadratic equation.

6. The apparatus of claim 1, wherein the at least some of the plurality of sensed touch inputs used to calculate the best fit for the parameters of the upsampling function is the most recent ten or fewer sensed touch inputs received from the touch device.

7. The apparatus of claim 1, wherein the touch device comprises either a capacitive touch panel or a resistive touch panel.

8. A method of generating touch inputs, comprising:
receiving, from the touch device, data representing a sensed time and sensed location on the touch device of each of a plurality of sensed touch inputs;
generating a model of the sensed touch inputs by calculating a best fit for parameters of an upsampling function based on the sensed location and sensed time of at least some of the plurality of the sensed touch inputs;
upsampling the sensed touch inputs using the model to generate at least one additional touch input at a point of the upsampling function corresponding to a time at which there is no sensed touch input and which is after a sensed time of a most recent sensed touch input of the plurality of sensed touch inputs, the point corresponding to an additional location on the touch device; and
displaying a visual representation of
  the sensed touch inputs at the sensed locations on the touch device, and
  the at least one additional touch input at the additional location on the touch device.

9. The method of claim 8, wherein generating the model of the sensed touch inputs comprises fitting a curve to the at least some of the plurality of sensed touch inputs.

10. The method of claim 8, wherein generating the model of the sensed touch inputs comprises using linear regression to calculate the best fit for the parameters of the upsampling function.

11. The method of claim 8, wherein generating the model of the sensed touch inputs comprises minimizing a mean square error between the sensed touch inputs and the generated at least one additional touch input.

12. The method of claim 8, wherein generating the model of the sensed touch inputs comprises using a quadratic equation.

13. The method of claim 8, wherein the at least some of the plurality of sensed touch inputs used to calculate the best fit for the parameters of the upsampling function is the most recent ten or fewer sensed touch inputs received from the touch device.

14. The method of claim 8, wherein displaying the at least one additional touch input occurs prior to receiving data representing a next touch input occurring after the plurality of sensed touch inputs.

15. The method of claim 14, further comprising updating the model after receiving the data representing the next touch input.

16. An apparatus for generating touch inputs, comprising:
means for receiving, from the touch device, data representing a sensed time and sensed location on the touch device of each of a plurality of sensed touch inputs;

means for generating a model of the sensed touch inputs by calculating a best fit for parameters of an upsampling function based on the sensed location and sensed time of at least some of the plurality of sensed touch inputs;

means for upsampling the sensed touch inputs using the model to generate at least one additional touch input at a point of the upsampling function corresponding to a time at which there is no sensed touch input and which is after a sensed time of a most recent sensed touch input of the plurality of sensed touch inputs, the point corresponding to an additional location on the touch device; and means for displaying a visual representation of
  the sensed touch inputs at the sensed locations on the touch device, and
  the at least one additional touch input at the additional location on the touch device.

17. The apparatus of claim 16, wherein means for generating the model of the sensed touch inputs comprise means for fitting a curve to the at least some of the plurality of sensed touch inputs.

18. The apparatus of claim 16, wherein means for generating the model of the sensed touch inputs comprise means for using linear regression to calculate the best fit for the parameters of the upsampling function.

19. The apparatus of claim 16, wherein means for generating the model of the sensed touch inputs comprise means for minimizing a mean square error between the sensed touch inputs and the generated at least one additional touch input.

20. The apparatus of claim 16, wherein means for generating the model of the sensed touch inputs comprise means for using a quadratic equation.

21. The apparatus of claim 16, wherein the at least some of the plurality of sensed touch inputs used to calculate the best fit for the parameters of the upsampling function is the most recent ten or fewer sensed touch inputs received from the touch device.

22. A non-transitory computer storage that stores executable program instructions that direct a wireless communications device to perform a process that comprises:

receiving, from the touch device, data representing a sensed time and sensed location on the touch device of each of a plurality of sensed touch inputs;

generating a model of the sensed touch inputs by calculating a best fit for parameters of an upsampling function based on the sensed location and sensed time of at least some of the plurality of sensed touch inputs;

upsampling the sensed touch inputs using the model to generate at least one additional touch input at a point of the upsampling function corresponding to a time at which there is no sensed touch input and which is after a sensed time of a most recent sensed touch input of the plurality of sensed touch inputs, the point corresponding to an additional location on the touch device; and displaying a visual representation of
  the sensed touch inputs at the sensed locations on the touch device, and
  the at least one additional touch input at the additional location on the touch device.

23. The non-transitory computer storage of claim 22, wherein generating the model of the sensed touch inputs comprises fitting a curve to the at least some of the plurality of sensed touch inputs.

24. The non-transitory computer storage of claim 22, wherein generating the model of the sensed touch inputs comprises using linear regression to calculate the best fit for the parameters of the upsampling function.

25. The non-transitory computer storage of claim 22, wherein generating the model of the sensed touch inputs comprises minimizing a mean square error between the sensed touch inputs and the generated at least one additional touch input.

26. The non-transitory computer storage of claim 22, wherein generating the model of the sensed touch inputs comprises using a quadratic equation.

27. The non-transitory computer storage of claim 22, wherein the at least some of the plurality of sensed touch inputs used to calculate the best fit for the parameters of the upsampling function is the most recent ten or fewer sensed touch inputs received from the touch device.

* * * * *